INVENTOR.
RUSSELL B. HUSSEY
BY
Raymond A. Paquin
ATTORNEY.

INVENTOR.
RUSSELL B. HUSSEY
BY
Raymond A. Paquin
ATTORNEY.

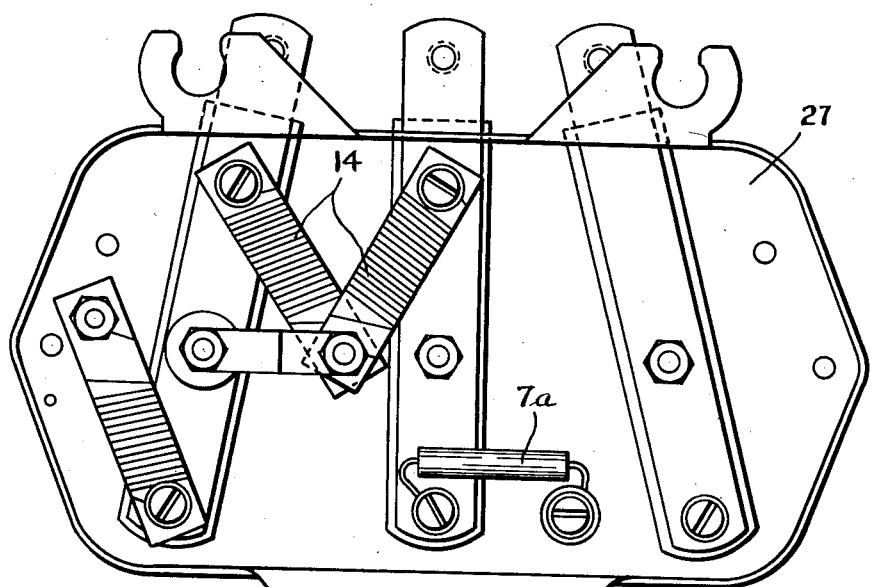
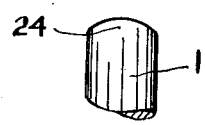
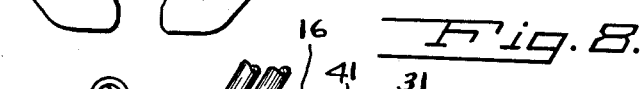
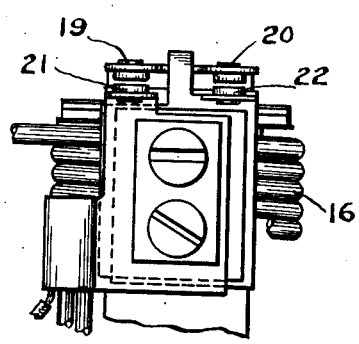

Patented June 1, 1954

2,680,217

UNITED STATES PATENT OFFICE 2,680,217

RELAY STRUCTURE

Russell B. Hussey, East Longmeadow, Mass., assignor to American Bosch Corporation, Springfield, Mass., a corporation of New York Application December 23, 1950, Serial No. 202,529

2 Claims. (Cl. 317—198)

This invention relates to vibrator type generator regulators and more particularly to a new and improved regulator of the type set forth adapted for use in connection with motor vehicles or the like.

This application is a continuation in part of my application, Serial No. 727,687, filed February 10, 1947, now abandoned.

Vibrator type generator regulators, as employed for many years in connection with motor vehicles, have been subject to several serious difficulties among the most important of which were the varying effects of gravity due to the position in which the regulator was mounted and also the effect of vibration.

In mounting the regulator on different engines or vehicles, it was not always feasible to mount the regulator on each type engine in exactly the same position. Due to this variance in the mounting of the regulators, it was found that gravity influenced settings or adjustments of the regulator and thereby necessitated different adjustments and settings depending upon the position of mounting of the regulator upon the particular engine or vehicle.

Vibration has also been found to be a serious problem in that it caused very great instability of voltage output at various vibration frequencies and this also was found to vary depending upon the plane of vibration with respect to the orientation of the regulator.

Many attempts have been made to overcome the above difficulties by providing weights, springs, rubber mountings of various types and damping devices of various kinds in an attempt to mount the armature of the regulator in such manner that it would not be affected by gravity or vibration. None of these attempts has been found satisfactory regardless of angular position of the regulator and in addition in some cases they increased the mass or size of the regulator and also increased the cost of the regulator.

I have found that the principal reason for the detrimental effect of gravity and vibration on prior regulators of this type has been due to the fact that the armatures of the relays are mechanically off balance and that by balancing the armatures of the regulator and hinging the armatures at their approximate center of gravity with substantially equal mass to either side of the pivot point, that gravity will have no effect on the operation of the regulator and also that vibration would have to be very extreme to cause undue instability and thus also allowing the installation of the regulator in various angular positions without any detrimental effect on its operation due to gravity or vibration.

It is, therefore, the principal object of this invention to provide a vibrator type voltage regulator for use in connection with motor vehicles or the like, the operation of which is not affected by gravity or vibration and which is inherently stable under all conditions.

Another object of the invention is to provide a regulator of the type set forth wherein the armatures of the relays are balanced at their approximate center of gravity with substantially equal mass on either side of the center about which said armatures pivot.

Another object of the invention is to provide a regulator of the type set forth having the armatures of the relays hinged so as to pivot about their approximate center of gravity with substantially equal mass on either side of the pivot.

Another object of the invention is to provide a new and improved hinge construction for pivotally mounting the relay armatures on the regulator relays.

Another object of the invention is to provide a simplified, relatively economical regulator of the type set forth which will be free from the disadvantages of prior regulators due to gravity and vibration.

Another object of the invention is to provide new and improved pivot points for the balanced armatures.

Another object of the invention is to provide cores for the relays of the regulator which cores are adapted to function as pivot points for the balanced armatures of the relays.

Another object of the invention is to provide a regulator of the type set forth wherein the armatures of the relays are balanced and wherein the magnetic force at the air gap, tending to move the armature, is counteracted by an adjusting spring.

Other objects and advantages of the invention will be apparent from the following description taken in connection with the accompanying drawings. It will be understood that many changes may be made in the details of construction and arrangement of parts without departing from the spirit of the invention as expressed in the accompanying claims. I, therefore, do not wish to be limited to the exact details of construction and arrangement of parts shown and described, as the preferred form has been given by way of illustration only.

Referring to the drawings:

Fig. 7 is a bottom view of the regulator;

Fig. 8 is a top or plan view showing the cut-out relay assembly on an enlarged scale;

Fig. 9 is a side view of Fig. 8;

Fig. 10 is a front view of Fig. 8;

Fig. 11 is a side view of one of the relay cores;

Figure 1:
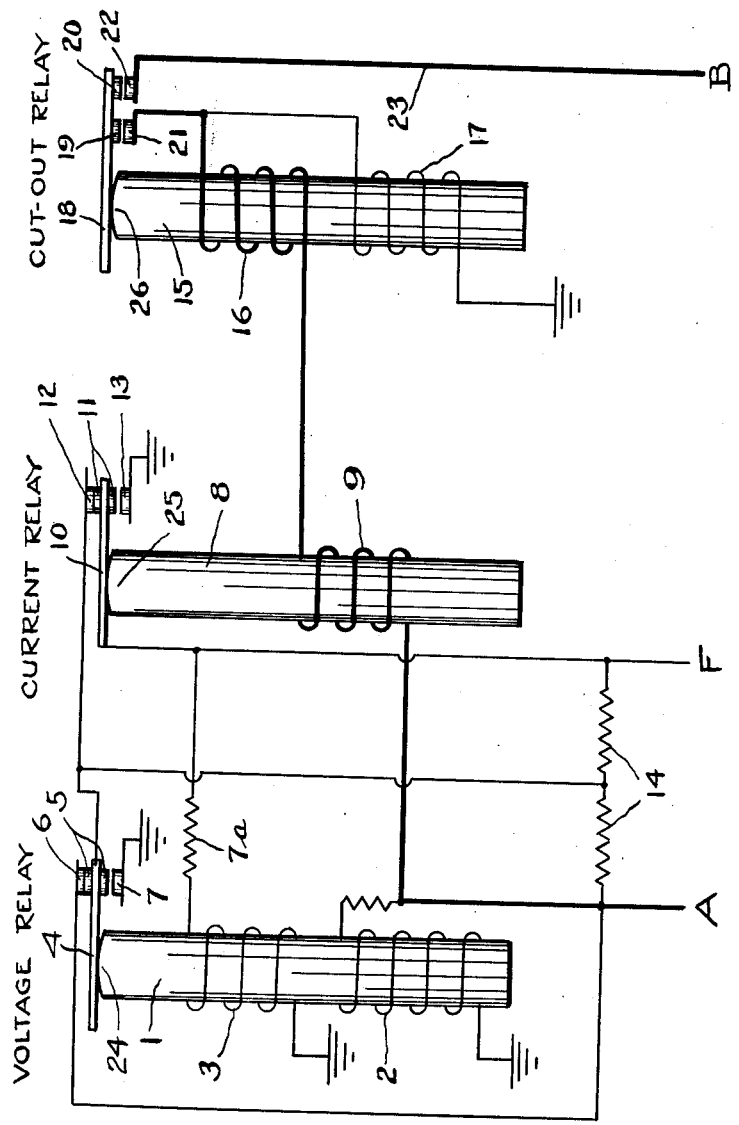
Fig. 1 is a diagrammatic view of one form of electrical circuit for regulators of the type set forth.
Figure 2:
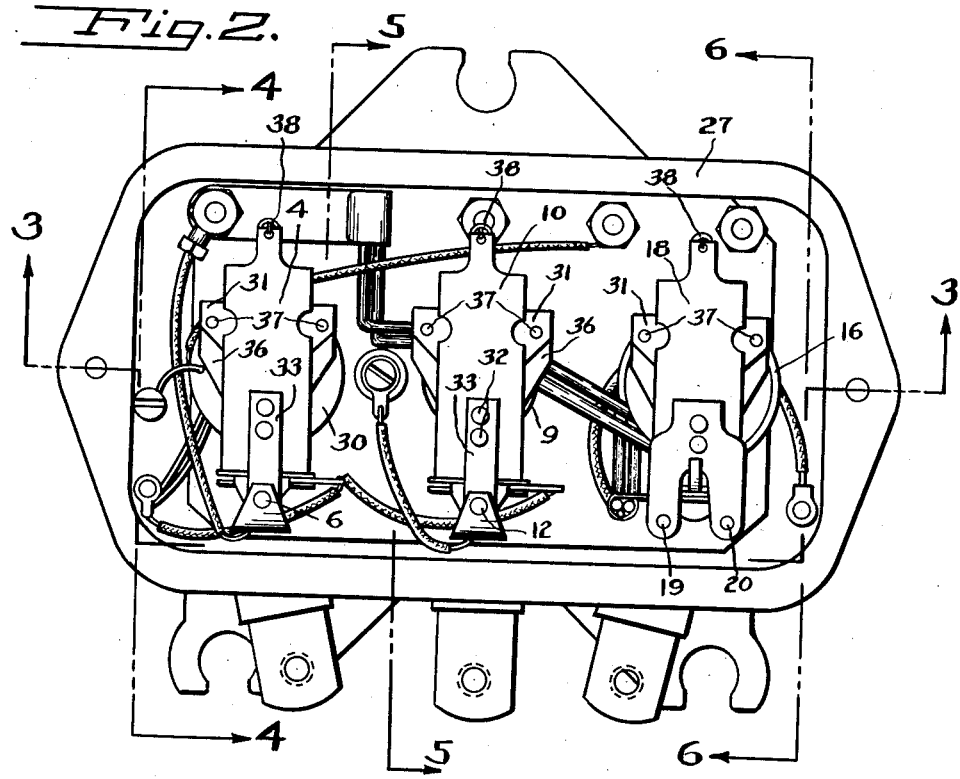
Fig. 2 is a top or plan view, with the cover removed, of a regulator embodying the invention.
Figure 3:
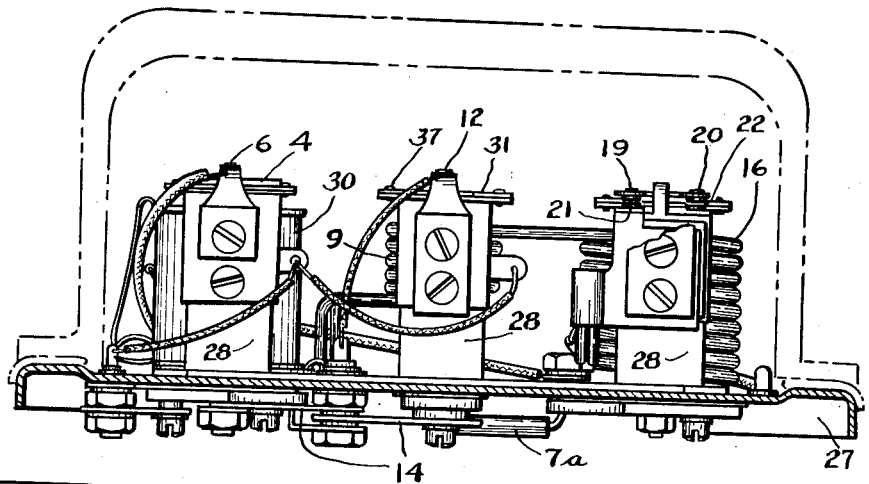
Fig. 3 is a view taken on line 3—3 of Fig. 2 looking in the direction of the arrows and showing the cover in dotted lines.

Referring more particularly to the drawings, wherein similar reference characters designate corresponding parts throughout the several views, there is shown in Fig. 1 one form of electrical circuit which may be employed in regulators embodying the invention. It will be understood that this electrical circuit is shown by way of illustration only, as the principal features of the present invention relate to mechanical arrangements of such regulators and may be employed in regulators having other electrical circuits as well.

In the form shown in Fig. 1, the regulator comprises a voltage relay, a current limiting relay and a cut-out relay. The three unit regulator is adapted for use in connection with motor vehicles and particularly for such systems wherein a battery is provided. If the regulator is used in such systems where a battery is not provided such as for use on tractors or the like, then the cut-out relay could be eliminated and the regulator connected directly to the electrical system or load of the vehicle. In such case the current limiting relay may or may not be used depending upon conditions.

The voltage relay comprises a core 1 on which is mounted the voltage shunt coil 2, a vibrator coil 3 and an armature 4 having the contacts 5 adapted to engage the contact 6 for lower stage regulation and the contact 7a for upper stage regulation. The resistor 7 is provided in series with the vibrator coil 3.

The current limiting relay comprises the core 8 on which is wound the series current limiting coil 9. This relay is provided with the armature 10 having the contacts 11 adapted to engage the contact 12 for lower stage current limiting and the contact 13 for upper stage current limiting. The resistors 14 are the regulating resistors.

The cut-out relay comprises the core 15 having the series cut-out coil 16 and cut-out shunt coil 17 wound thereon. This relay is provided with the armature 18 having the bridging contacts 19 and 20 adapted to engage the contact 21 which is connected to coils 16 and 17 and the contact 22 which is connected to the battery lead 23. The terminal A is the armature terminal; the terminal F is the field terminal and the terminal B is the battery terminal.

The voltage relay shows two stage regulation and the current relay shows two stage current limitation. It will be understood that these relays can be of the single stage type if desired, as the double stage type has been shown only by way of illustration.

It will be noted that the upper end 24 of the voltage relay core 1, the upper end 25 of the current limiting relay core 8 and the upper end 26 of the cut-out relay core 15 are rounded in one direction only so as to form a pivot point for the armatures 4, 10 and 18 respectively and yet prevent rocking or sidewise pivotal movement of the armature on said cores. The armatures are balanced about said pivot points and hinged thereto at approximately the center of gravity with substantially equal mass or weight on either side of the pivot point whereby any effect of gravity is cancelled out on either side of the pivot point and as the armature is balanced on the pivot point, the effect of any vibration forces are cancelled out and have negligible effect.

In Figs. 2 to 11 inclusive are shown a form of regulator embodying the invention and having the electrical circuit illustrated in Fig. 1.

Figure 4:
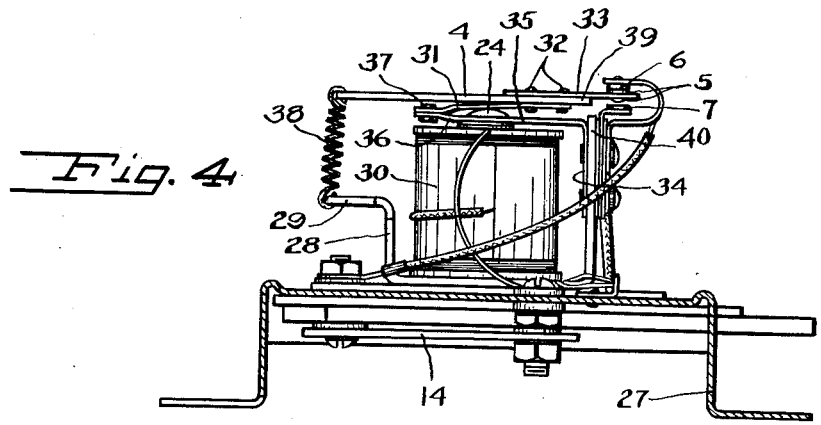
Fig. 4 is a view taken on line 4—4 of Fig. 2 looking in the direction of the arrows.
Figure 5:
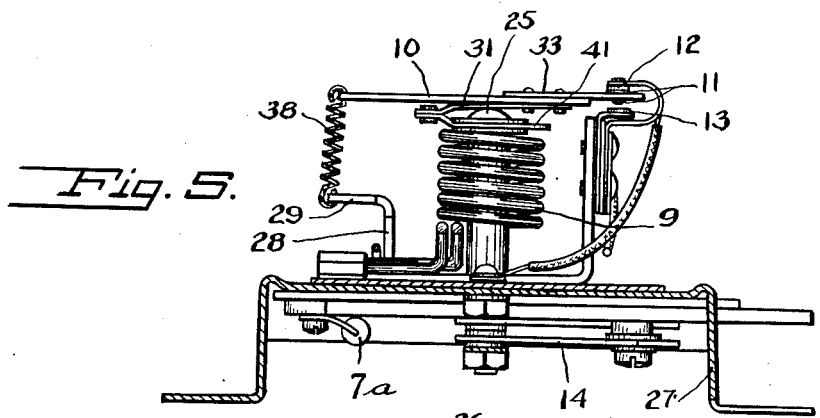
Fig. 5 is a view taken on line 5—5 of Fig. 2 looking in the direction of the arrows.
Figure 6:
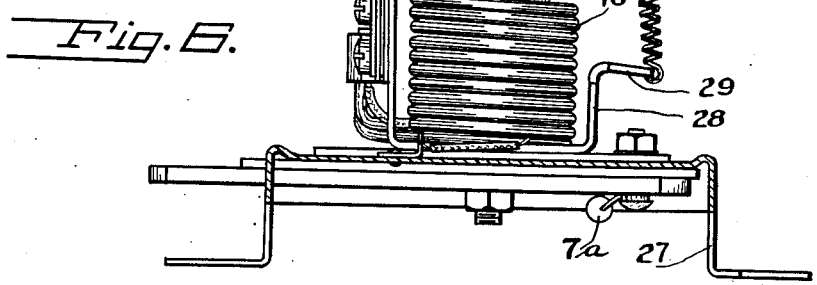
Fig. 6 is a view taken on line 6—6 of Fig. 2 looking in the direction of the arrows.

This form of the invention comprises a base 27 on which are secured the voltage regulating relay shown in Fig. 4, the current limiting relay shown in Fig. 5 and the cut-out relay shown in Fig. 6.

The voltage regulating relay shown in Fig. 4 comprises the yoke 28 having the deflected end portion 29 as hereinafter described. This relay also is provided with the vibrator coil 3 and voltage shunt coil 2 which are shown collectively at 30 and through which extend the core 1. The core 1 and yoke 28 are preferably of low carbon steel but could be formed of other suitable material. The core 1 has its upper end 24 curved in one direction as described in connection with Fig. 1 and the armature 4 is pivotally mounted adjacent its center on said end 24 by means of the leaf hinge 31 which is secured to the armature 4 by the rivets 32 which also secure the contact bearing lever 33 to said armature 4 although said hinge 31 could be secured to the armature 4 by other suitable means. The magnetic shunt temperature compensation member 34, which is of nickel iron steel, is provided with one end secured to a side of the yoke 28 and said magnetic shunt has an opening through its arm 35 through which the head 24 of the core 1 extends after which said head 24 is staked to retain it in connection with the arm 35 of the shunt member 34. The arm 35 has an extension portion 36 to which the end of the leaf hinge member 31 is secured by rivets or other suitable means 37.

The leaf member 31 is flexible and is adapted to function as a hinge member and locator for the armature 4, and preferably has negligible rigidity and, therefore, said hinge or leaf member 31 has practically no spring force and the adjusting spring 38, which has one end connected to the adjacent end of the armature 4 and its opposite end connected to the deflected portion 29 of the yoke 28, functions as the actuating spring for actuating the armature.

The armature assembly, that is the armature 4 and leaf or hinge 31, are in intimate contact with the upper end 24 of the core 1 and, therefore, the working air gap for the magnetic flux actuating the armature is between the free end 39 of the armature 4 and the upper end 40 of the yoke 28. Thus magnetic flux tends to pull the end 39 of the armature down towards the end 40 of the yoke 28 and this force is counteracted by the force of the adjusting spring 38 which causes pivotal movement of the armature 4 on the upper end 24 of the core 1 as a center or pivot point. Due to the perfect balance, the effect of gravity on the armature on either side of the pivot point is cancelled out and position or vibration have a negligible effect on the operation of the armature. It is also pointed out that because of the rounding of the top 24 of the core 1, as previously described, any shifting of the center or pivot point on which the armature 4 pivots or rocks is avoided. It is pointed out that instead of rounding the end 24, this end could be in the form of a knife edge, but the rounding is desirable to avoid any tendency to sharply bend or kink the hinge leaf 31 at that point. As also previously stated, this edge 24 is rounded in one direction only to prevent sidewise tipping or rocking of the armature on its pivot.

The current limiting relay shown in Fig. 5 and the cut-out relay shown in Fig. 6 have armatures pivoted in a similar manner to the voltage regulation relay shown in Fig. 4 and which have been previously described. As the construction of these relays so far as the balanced armature is concerned is similar to the construction of the voltage regulation relay, their construction will be readily recognized from Figs. 5 and 6 respectively, as the armature 10 of the current regulation relay and the armature 18 of the cut-out relay are provided with the leaf hinge members 31 which in the case of these relays are connected to the members 41 which are generally similar to the magnetic shunt 34 in so far as the ends of the cores 25 and 26 extend therethrough respectively and are staked for retaining the parts in assembled relation. In this case the member 41, which is of low carbon steel, is not connected to the side of the yoke 28 but could be so connected and made of a suitable material should a magnetic shunt and temperature compensation be desired.

Figure 12:
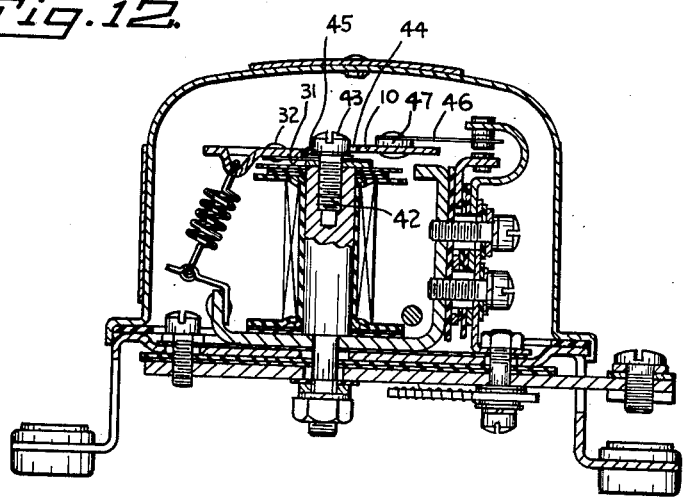
Fig. 12 is a view similar to Fig. 4 but showing another form of the invention.
Figure 13:
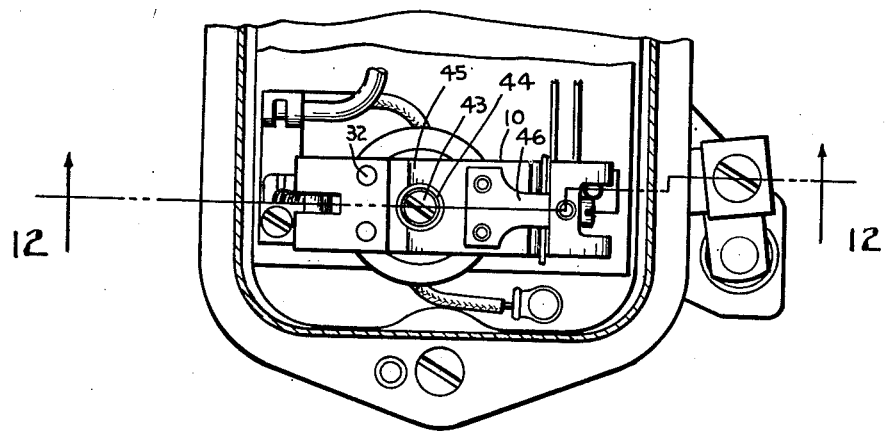
Fig. 13 is a top or plan view of the form of the invention shown in Fig. 12.

In the form of the invention shown in Figs. 12 and 13, there is provided the armature 10 having the spring hinge member 31 secured thereto by rivets or the like 32.

In this construction the spring hinge member 31 is connected directly to the core 26 by means of screw 42 which extends through an opening in said spring hinge member and the head 43 of screw 42 extends through an aligned opening 44 in armature 10.

The armature 10 has the offset 45 adjacent opening 44 and in alignment with spring hinge 31 in order to space armature 10 a sufficient distance from the spring hinge 31 so that the movement of the armature is not restricted.

Spring contact carrying member 46 is secured to armature 10 by means of rivets or the like. A spacer 47 can be employed between armature 10 and contact carrying member 46 to obtain spring action of said contact carrying member. This spacer 47 need not be employed in the cut out relay.

For the voltage regulating and cut out relays, spring hinge 31 can be bimetallic in order to provide temperature compensation for the relay.

This construction is even simpler and less expensive than the form shown in Figs. 1 through 11, and also facilitates the servicing or replacement of the parts.

The hinge arrangement shown has been found to hold the armature in correct balanced position and to allow the armature to pivot on the core as a center. This hinge construction has been found to have numerous advantages in that it is relatively simple and economical in construction yet efficient and satisfactory in operation.

While the leaf form of hinge has been shown as preferable for the reasons given, it will be understood that other suitable forms of hinges could be employed for the same purpose.

The principal difference between the present regulator and prior type regulators is that in the present invention the armatures of each of the relays are hinged at their center of gravity to pivot about their respective cores as a center and in the specific form of hinge shown for the purpose of illustrating the invention, each core carries a steel leaf hinge supporting plate having an extension or ears to which the hinge is riveted. The hinge or leaf lays between the core and its armature with the core slightly rounded so as to give a rolling action at the point of contact.

The working air gap is between the armature and the yoke and contacts are carried by the armature and yoke. At the rear of the relay coil springs are employed between the armatures and projections or extensions on the yokes for calibration purposes.

Substantially identical armatures and yokes are employed on all three relays with the cut-out relay employing a bridge type contact arrangement. The voltage regulator relay and the current limiting relay are both equipped with upper and lower stage control and the voltage regulator relay also has a vibrator winding to effect high frequency of lower regulation which makes for greater stability.

Since the armatures are hinged at their approximate center of gravity with equal mass to either side of the pivot point, it will be seen that gravity will have no serious effect and also that vibration would have to be very extreme to cause undue instability.

From the foregoing it will be seen that I have provided simple, efficient and economical means for obtaining all of the objects and advantages of the invention.

Having described my invention, I claim:

1. In a vibrator type voltage regulator, a relay including a substantially U-shaped yoke, a core therefor, a flat plate-like armature therefor, said armature being pivotally mounted on said core at its approximate center of gravity with substantially equal portions extending each side of said core, a horizontally disposed flat one-piece leaf spring hinge having one end connected to the top of said core and extending outwardly therefrom, said outwardly extending portion of said spring hinge being rigidly connected to one of the half portions of said armature, the other half portion of said armature being bent upwardly and then down and outwardly in alignment with said spring hinge and parallel thereto to provide an offset at its middle portion above said core in order to space said other half portion of the armature laterally a sufficient distance from the spring hinge and the entire upper end of said core to permit free movement of said armature with respect to said core.

2. In a vibrator type voltage regulator, a relay including a substantially U-shaped yoke, and a core therefor, a flat plate-like armature therefor, said armature being pivotally mounted on said core at its approximate center of gravity with substantially equal portions extending each side of said core, a horizontally disposed flat one-piece leaf spring hinged having one end connected to the top of said core and extending outwardly therefrom, said outwardly extending portion of said spring hinge being rigidly connected to one of the half portions of said armature, the other half portion of said armature being bent upwardly and then down and outwardly in alignment with said spring hinge and parallel thereto to provide an offset at its middle portion above said core in order to space said other half portion of the armature laterally a sufficient distance from the spring hinge and the entire upper end of said core to permit free movement of said armature with respect to said core, said armature, core and spring hinge having aligned openings, and fastening means insertable through said openings in said armature and spring hinge and into said core providing means for removably securing only said spring hinge to said core.

References Cited in the file of this patent

UNITED STATES PATENTS

| Number | Name | Date |
|---|---|---|
| 1,716,357 | Erickson | June 4, 1929 |
| 1,968,971 | Sullivan | Aug. 7, 1934 |
| 2,076,857 | Morgenstern | Apr. 13, 1937 |
| 2,098,926 | Schneider | Nov. 9, 1937 |
| 2,344,809 | Eaton | Mar. 21, 1944 |
| 2,300,796 | Kovalsky | Dec. 11, 1945 |
| 2,391,692 | Estes | Dec. 25, 1945 |
| 2,519,093 | Zoerlein | Aug. 15, 1950 |